Jan. 1, 1935.　　G. N. GOODRICH ET AL　　1,985,893
BATTERY GRID CASTING MACHINE
Original Filed July 3, 1930　　7 Sheets-Sheet 1

Fig. 1

Inventors
George N. Goodrich
Carl G. Reetz
By Stryker & Stryker
Attorneys

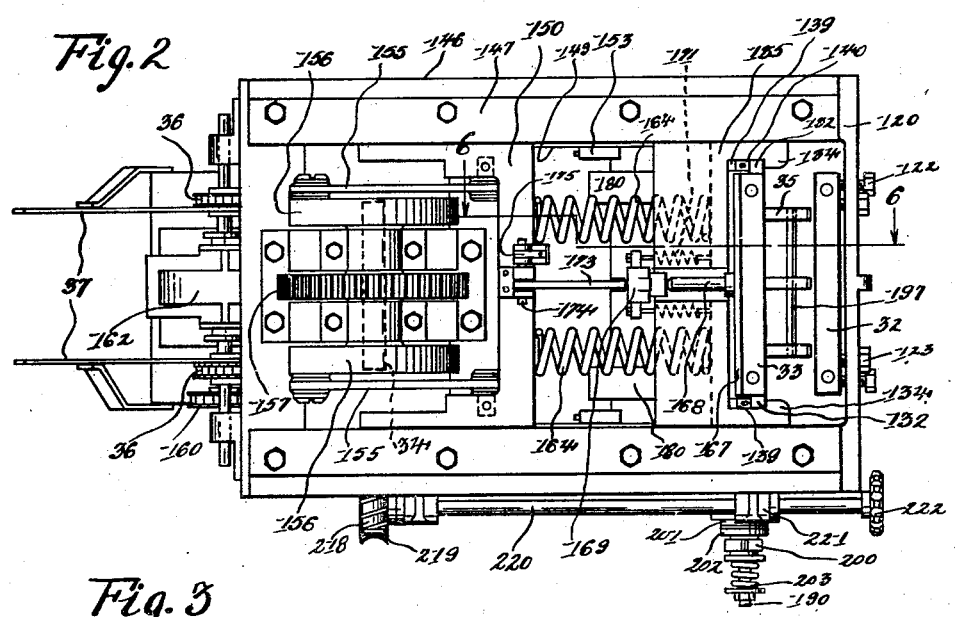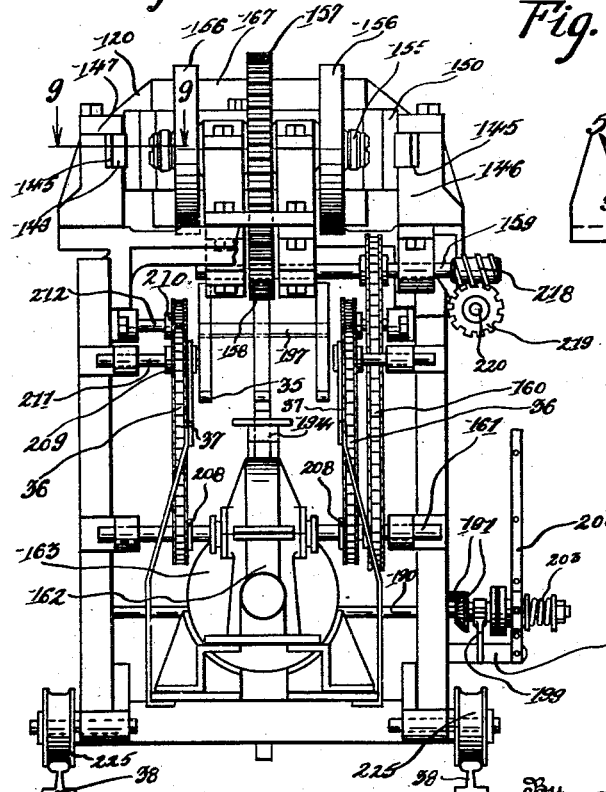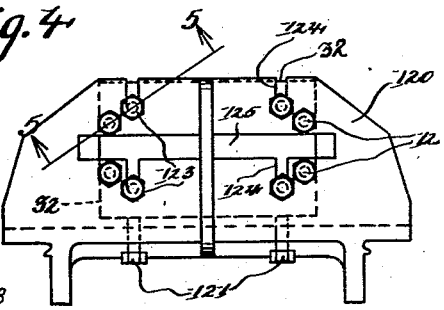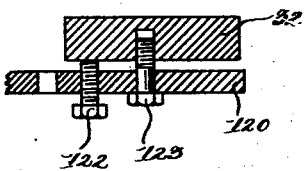

Jan. 1, 1935. G. N. GOODRICH ET AL 1,985,893
BATTERY GRID CASTING MACHINE
Original Filed July 3, 1930 7 Sheets-Sheet 3
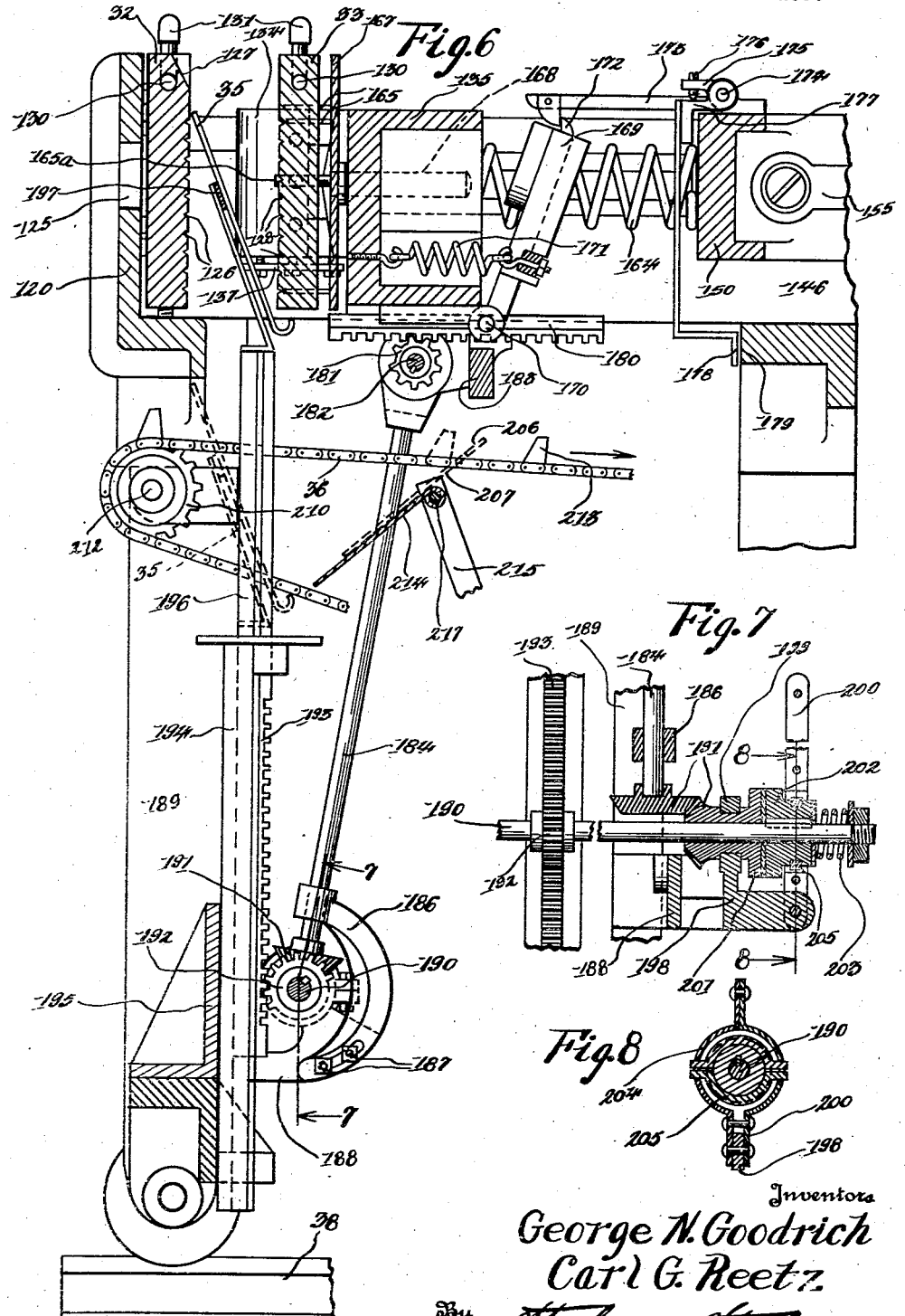
Inventors
George N. Goodrich
Carl G. Reetz
By Stryker & Stryker
Attorneys

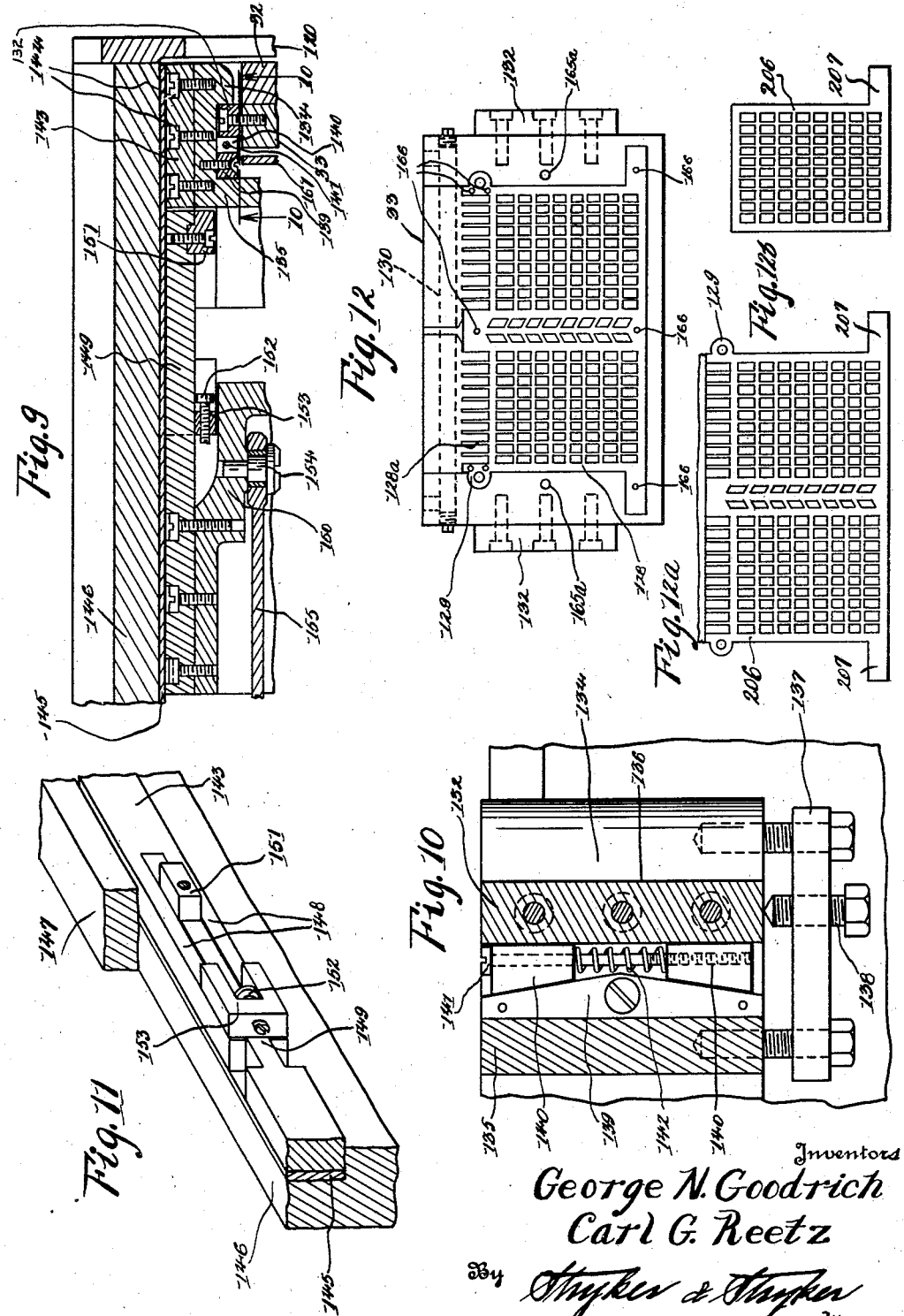

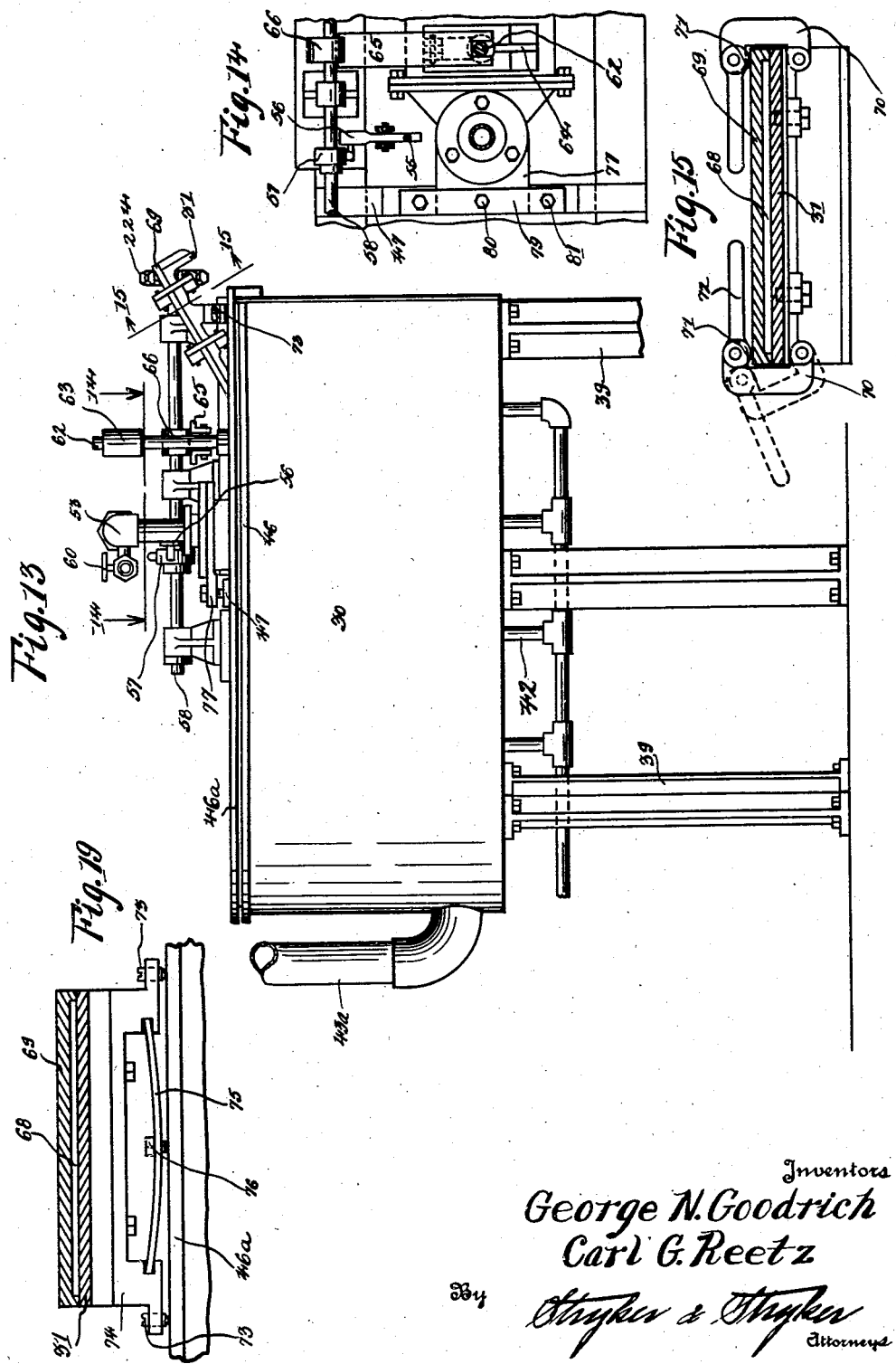

Jan. 1, 1935.  G. N. GOODRICH ET AL  1,985,893
BATTERY GRID CASTING MACHINE
Original Filed July 3, 1930  7 Sheets-Sheet 6

Inventors
George N. Goodrich
Carl G. Reetz
By Stryker & Stryker
Attorneys

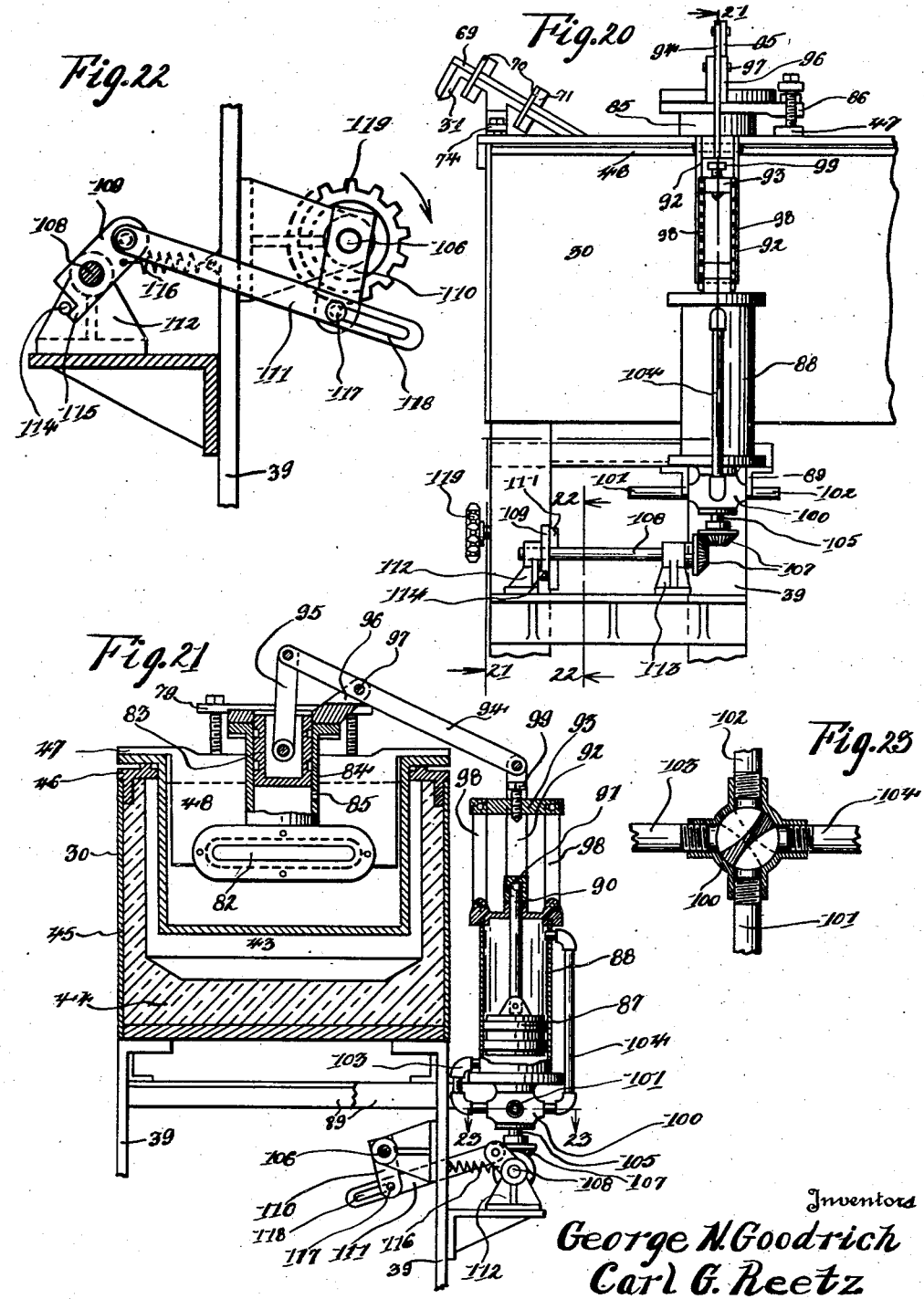

Patented Jan. 1, 1935

1,985,893

UNITED STATES PATENT OFFICE 1,985,893

BATTERY GRID CASTING MACHINE

George N. Goodrich, Walled Lake, Mich., and Carl G. Reetz, St. Paul, Minn., assignors to National Battery Company, St. Paul, Minn., a corporation of Delaware Application July 3, 1930, Serial No. 465,592
Renewed April 4, 1934

17 Claims. (Cl. 22—57)

It is the object of this invention to provide an improved machine adapted to eliminate the greater part of the hand work which has heretofore been necessary in molding the grids for storage batteries and at the same time to promote uniformity in the grids.

A further object is to provide efficient means for removing the grids from the mold and for conveying them to a suitable place of delivery where they are automatically collected.

The invention also includes important details of construction which facilitate cleaning and other preparations for resuming operation after the machine has been shut down.

Figure 16:
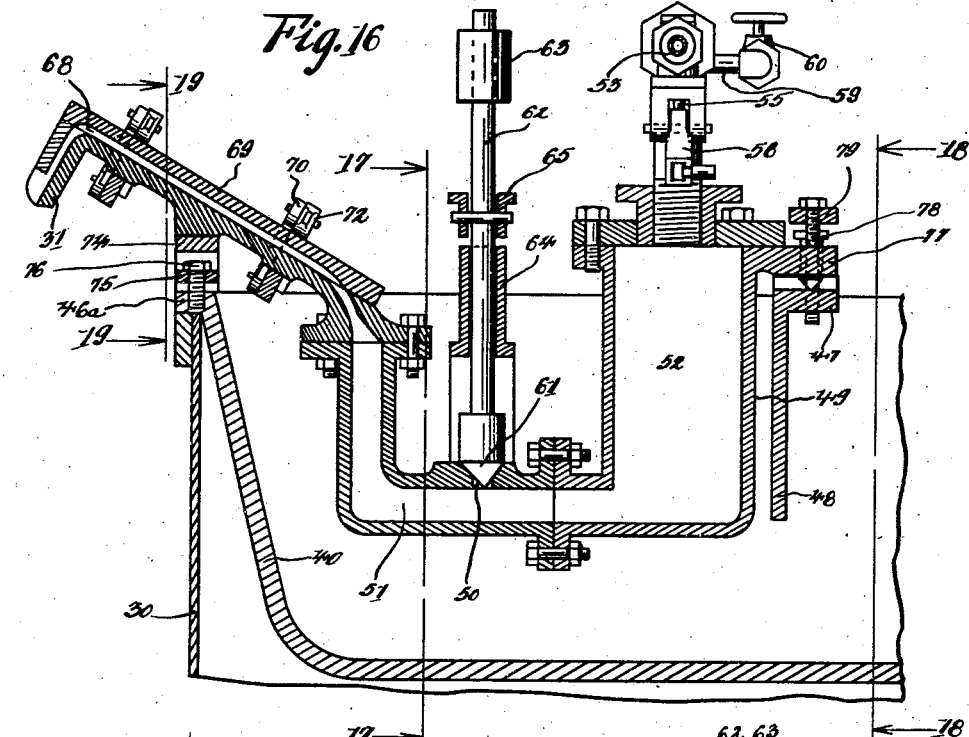
Figures 17, 18:
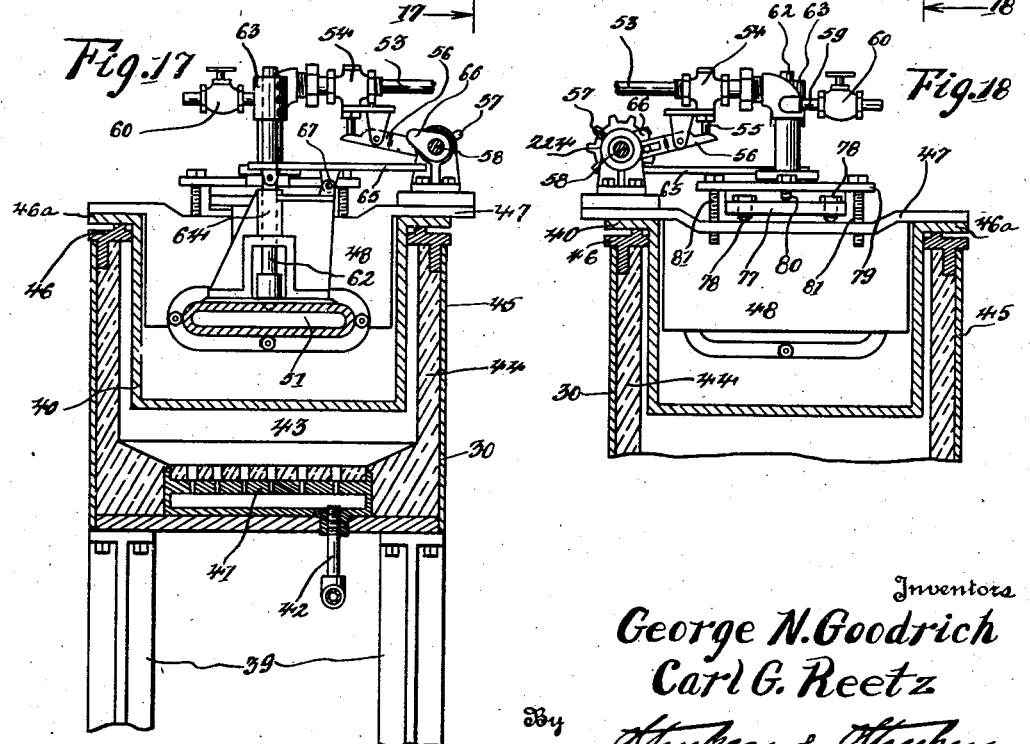

The invention will be best understood by reference to the accompanying drawings in which Figure 1 is a side elevation of the machine with a portion of the furnace and lead pot removed, together with parts of one of the side rails of the mold operating mechanism; Fig. 2 is a plan view of the mold and operating mechanism separate from the furnace; Fig. 3 is an end view of the machine; Fig. 4 is an elevation of the support for the stationary mold member; Fig. 5 is a fragmentary section taken on the line 5—5 of Fig. 4; Fig. 6 is an enlarged vertical section taken on the line 6—6 of Fig. 2; Fig. 7 is a fragmentary section taken on the line 7—7 of Fig. 6; Fig. 8 is a section taken on the line 8—8 of Fig. 7; Fig. 9 is a horizontal section taken on the line 9—9 of Fig. 3; Fig. 10 is a section taken on the line 10—10 of Fig. 9; Fig. 11 is a fragmentary, perspective view of the guide for the bars connecting the mold carriage with its operating mechanism; Fig. 12 is an elevation showing the interior of the movable mold member; Fig. 12a illustrates a pair of grids as they come from the mold; Fig. 12b illustrates one of the grids after trimming; Fig. 13 is a side elevation of the lead pot; Fig. 14 is a fragmentary section taken on the line 14—14 of Fig. 13; Fig. 15 is a section taken on the line 15—15 of Fig. 13; Fig. 16 is a central longitudinal section through the lead pot; Fig. 17 is a transverse section through the same taken on the line 17—17 of Fig. 16; Fig. 18 is a fragmentary, transverse section taken on the line 18—18 of Fig. 16; Fig. 19 is a section taken on the line 19—19 of Fig. 16; Fig. 20 is a fragmentary side elevation showing an alternate form of lead delivery pump; Fig. 21 is a section taken on the line 21—21 of Fig. 20; Fig. 22 is a section taken on the line 22—22 of Fig. 20 and Fig. 23 is a fragmentary, horizontal section through the four-way valve taken on the line 23—23 of Fig. 21.

We provide a furnace 30 in which the metal is reduced to the proper molten condition. Associated with the furnace is mechanism for periodically delivering a measured quantity of the molten lead to a mold through a spout 31. The mold proper comprises two members, indicated by the numerals 32 and 33 respectively, and these members are separable in a vertical plane to permit withdrawal of the grids as they are successively formed. The member 32 is normally stationary while the member 33 is periodically closed against the member 32 and opened to permit removal of the grids. The mold member 33 is actuated by a ram, hereinafter described, having connections with a power-driven shaft 34.

Vertically reciprocating delivery mechanism has fingers 35 extensible between the separated mold members. These fingers receive the grids, one at a time, from the mold and lower them upon conveyor chains 36. The chains 36 deposit the grids successively on a collecting rack 37. Ejecting mechanism is provided to forcibly remove the grids from the mold. To permit ready separation of the machine into its two main parts the molds, rack 37, and operating mechanisms for said ejecting mechanism and for the fingers 35, chains 36 and mold member 33 are supported on a carriage which is movable along tracks 38. This is an important feature of the invention as it allows access to the mold and other parts where necessary for cleaning and preparing the machine for operation. The furnace and associated mechanism are supported on suitable legs 39.

Metal supply mechanism

The furnace, indicated generally by the numeral 30, has a lead pot 40 adapted to be charged with metal to be reduced to molten condition. As best shown in Figs. 16, 17 and 18 heat is supplied, in the embodiment illustrated, by gas burning at burners 41 having gas supply pipes 42. A combustion chamber 43 is lined with suitable refractory material 44 within a casing 45 and a vent pipe 43a (Fig. 13) communicates with the combustion chamber. Around the top of the casing 45 is a frame 46 which supports the lead pot 40 by means of a projecting flange 46a formed integral with said lead pot. Mechanism for delivering measured quantities of the lead through the spout 31 is supported upon flange 46a as is also a bar 47 which is integral with a baffle plate 48 in the lead pot 40. This baffle plate prevents the passage of the oxidized metal and floating impurities from the charging chamber 49 to inlet port 50. This port supplies metal to a throat 51 communicating with the spout 31 at one end and with an air chamber 52 at its other end.

Air under pressure is supplied to the chamber 52 through a pipe 53 having a control valve 54. This valve 54 is preferably of the well-known type having an internal spring to normally hold it in closed position and a stem 55 which may be pressed against the action of the spring to open the valve. A lever 56 is actuated by a cam 57 to periodically open the air valve 54, said cam 57 being fixed on a power-driven shaft 58 having a projection which engages a pin on the lever 56, as best shown in Fig. 14. An air escape pipe 59 communicates with the air pipe 53 between the valve 54 and chamber 52 and the opening of the escape pipe may be regulated by a valve 60. This valve 60 permits adjustment of the quantity of lead which is delivered to the spout 31 upon each opening of the valve 54.

The lead port 50 for the throat 51 has a closure head 61 (Fig. 16) mounted on the lower end of a plunger 62. A weight 63 on the upper end of the plunger normally holds the head 61 in closed position, a suitable bearing 64 being provided for said plunger. To periodically open the port 50 a lever 65 is secured at one end to the plunger 62 and is arranged to be actuated at its other end by a cam 66 fixed on the shaft 58. A suitable fulcrum support 67 is provided for the lever 65.

As best shown in Figs. 15 and 16, the spout 31 is designed to be readily taken apart to allow access to a wide, relatively thin passage 68 for the molten metal. A cover plate 69 is normally held in place by four U-shaped arms 70 having clamping cams 71 pivotally secured to their upper ends. Each cam 71 may be actuated by a handle 72 to grip or release the cover plate 69. To free the plate 69 it is only necessary to actuate the levers 72 and swing the arms 70 outward, as indicated in dotted lines in Fig. 15.

It is important, in order to deliver metal in ribbon-like stream of uniform thickness from the spout 31, that said spout be accurately leveled transversely of the flow. To facilitate the leveling operation, we support the spout 31 on set screws 73 which are threaded in suitable projections on a support 74 and rest at their lower ends on the flange 46a. A stout leaf spring 75 is located in a central aperture in the support 74 and has a cap screw 76 holding the spring under tension, said screw being threaded in the flange 46a. The ends of the spring 75 engage in recesses in the support 74, the screws 73 being adjusted against the action of the spring 75 to place the passage 68 in properly leveled position. As the spout 31 is rigidly secured to the throat 51 and air chamber 52, the last mentioned parts must be leveled in accordance with the spout. To this end we provide a horizontal flange 77 integral with the chamber 52 and adjustably supported on the bar 47 by set screws 78. The air chamber and connected parts are held down in the lead pot by a bar 79 (Fig. 18) having a set screw 80 threaded centrally therein to engage the flange 77 and bolts 81 connecting the bar 79 in spaced relation to the bar 47. The set screw 80 may be loosened to permit adjustment of the screws 78 in accordance with the adjustment of the screws 73.

In the alternate form of metal supply mechanism, shown in Figs. 20 to 23 inclusive, the furnace, lead pot and spout are similar to the corresponding parts above described, but lead is forced into a throat 82, communicating with the spout, by a piston 83 operating in a cylinder 84 having a normally open port 85 communicating with the lead pot. The lower end of the cylinder 84 communicates freely with the throat 82 and is integral therewith while the upper end of said cylinder is supported on a flange 86. This flange 86 is adjustably supported on the bar 47, as illustrated and described with reference to the flange 77.

A piston 87 in an air cylinder 88 is operatively connected to the piston 83. Frame members 89 support the cylinder 88 at its lower end and projecting from the upper end of said cylinder is a piston rod 90 having a head 91 secured thereto. Links 92 are pivotally joined to opposite sides of the head 91 and pass upward therefrom on opposite sides of a guide bar 93. To the links 92, at their upper ends, a lever 94 is pivotally secured and this lever is joined to the piston 83 by a link 95. Suitable ears 96 project upward from the head of the cylinder 84 to receive a pin 97 upon which the lever 94 is pivotally supported. The bar 93 is supported in spaced relation to the upper end of the cylinder 88 upon arms 98 and this bar 93 also carries a stop screw 99 for limiting upward movement of the cross-head 91.

A four-way valve 100 mounted on the bottom of the cylinder 88 is adapted to be supplied with air under pressure from a pipe 101 and at its opposite side has an exhaust pipe 102 communicating therewith. A pipe 103 places the valve casing in communication with the lower end of the cylinder 88 and a pipe 104 connects the upper end of the cylinder with the valve. A downwardly projecting shaft 105 is provided for operating the valve and this shaft is adapted to be oscillated about its axis by suitable connections with a power-driven shaft 106. The connections illustrated comprising bevel gears 107, a shaft 108, a crank 109 on said shaft, a crank 110 on the shaft 106, and a link 111 connecting the crank 110 with the crank 109. The shaft 108 has suitable bearing supports 112 and 113. From the bearing support 112 a stop pin 114 projects to engage a lug 115 on the crank 109. A coiled spring 116 normally retains the lug 115 in engagement with the stop pin 114. The connection between the crank 110 and link 111 comprises a pin 117 fixed on the crank 110 and engaging the link 111 in an elongated slot 118. A sprocket wheel 119 is fixed on a projecting end of a shaft 106 to drive it.

When the valve 100 is in the full line position shown in Fig. 23 the piston 87 is forced to the lower end of the cylinder 88 by air admitted through the pipes 101 and 104. This is the normal position of the mechanism which results in supporting the piston 83 above the surface of the molten metal. Periodically, and in timed relation to the molding mechanism, the valve 100 is moved to its dotted line position shown in Fig. 3 to thereby thrust the piston 87 upward by compressed air admitted through the pipes 101 and 103. This operation causes the piston 87 to cover the port 85 and then to displace a predetermined quantity of the metal from the cylinder and forcibly eject it through the spout 31. The piston is immediately raised by the return of the valve 100 to its full line position.

As best shown in Fig. 22, the connections between the drive shaft 106 and shaft 108 are such that, starting from the position illustrated in Fig. 22, the link 111 is thrust to the left while the crank arm 110 moves into alignment with the link 111. This causes the shaft 108 to be turned through an angle of approximately 90 degrees and thereby effect the movement of the valve 100 to the dotted line position shown in Fig. 23. As the shaft 106 rotates further the crank 109 is allowed to return to the right (Fig. 22) until the lug 115 engages the pin 114. Further rotation of the crank 110 through an angle of about 180 degrees merely moves the pin 117 in the slot 118 while the valve 100 dwells in its position to elevate the piston 83. This completes the cycle of operation.

Mold construction

Fixed at one end of the movable frame supported by the tracks 38 is a mold support 120 (Figs. 2, 4, 5 and 6). This support has secured to its inner face the stationary mold member 32. Adjustable connections between the mold and support comprise vertical supporting bolts 121, horizontal thrust bolts 122 and horizontal pull bolts 123. The pull bolts 123 extend through vertical slots 124 which permit vertical adjustment of the stationary mold member while the thrust bolts 122 facilitate horizontal adjustment of the mold member by affording a movable abutment for the back surface. The upper pair of the slots 124 extend downward from the upper edge of the support 120 and the lower pair of slots communicate at their upper ends with an enlarged opening 125 which permits ready removal of the mold member 32. It will now be understood that said mold member 32 may be removed by merely loosening the bolts 123 and then raising said member to withdraw the bolts 123 from the slots 124. The front face of the mold member 32 has suitable depressions 126 adapted to form one face of a grid and along its upper edge said member is cut away to afford a passage 127 into which molten metal is delivered from the spout 31.

As best shown in Figs. 6 and 12, the movable mold member 33 has in its face depressions 128 to receive the metal for forming the grid; and as best shown in Fig. 12a, we prefer to mold two grids simultaneously, these grids being subsequently separated and trimmed in a press to produce a grid like that illustrated in Fig. 12b. The depression 128 in the mold has an extension 128a along its upper edge to receive an excess of metal which is subsequently removed in the trimming operation. The usual perforated ears 129 are also formed on each of the individual grids to facilitate centering them in the trimming press.

Passages 130 for cooling fluid are formed in the mold members and arranged to be supplied with fluid through inlet and outlet hose connections 131 (Fig. 6). As shown in Figs. 2, 10 and 12, a rectangular wing 132 is bolted to each vertical edge of the movable mold member 33. These wings are removably held between a pair of hook-like arms 134 and wedge blocks 140 on a ram carriage 135. The arms 134 have vertical surfaces 136 engaging similar surfaces on the wings 132 and as best shown in Fig. 10, a supporting bar 137 extends beneath each of the wings 132, said bar being secured by suitable cap screws to the carriage 135 and hook member 134. A screw 138 is threaded in each bar 137 and projects above the same to adjustably support the adjacent wing member 132. A stationary wedge member 139 is fixed on the carriage 135 near each wing 132 to coact with a pair of movable wedge blocks 140 connected by a screw 141. The blocks 140 are urged apart by a compression spring 142 confined between the blocks on the screw 141, said screw being threaded in the lower wedge block and being freely revoluble in the upper block. By the arrangement shown, the wings 132 are firmly gripped between the surfaces 136 and wedge blocks 140 when the screws 141 are turned to draw the blocks 140 together. When said screws are turned in the reverse direction the springs 142 separate the wedge blocks 140 so that the movable mold member may be readily removed. In order to properly locate the movable mold member 33 relative to the stationary member 32 the screws 138 may be turned.

Mold actuating mechanism

As shown in Figs. 9 and 11, the carriage 135 is secured at each side of the machine to an actuating bar 143 by a series of bolts 144 and the bars 143 are slidable in suitable guide grooves 145 in side frame members or rails 146. Removable cover plates 147 are bolted to the frame to retain the bars 143 in the guide grooves. Bifurcated ends 148 on the bars 143 are adapted to slidably receive between them reduced members 149 of a suitable ram head 150 which is also slidable in the guide grooves 145. On the extremity of each member 149 is fixed a stop lug 151 adapted to engage a screw 152 threaded in a U-shaped block 153. This block 153 connects the extremities of the members 148 and projects in the path of the lug 151. The screws 152 may be adjusted to accurately time the opening of the mold, hereinafter described. The ram head 150 has pivot pins 154 securing it to a pair of connecting rods 155 and these rods are in turn secured to the outer faces of discs 156. The axial shaft 34 is keyed to the discs 156 and adapted to be driven by a central spur gear 157. To drive the gear 157, a pinion 158 is disposed in mesh with said gear on a counter-shaft 159 and this counter-shaft is adapted to be driven through suitable sprocket wheels and a chain 160 from another shaft 161. Suitable speed reducing gears in a housing 162 are arranged to rotate the shaft 161 and to be driven by an electric motor 163.

Interposed between the cross head 150 and the movable mold member 33 is a pair of stout compression springs 164 urging the cross head and mold member apart and tending to hold the lugs 151 in engagement with the stop screws 152. It will now be evident that the cross head 150 and carriage 135 constitute two, relatively movable ram parts for actuating the mold.

Ejecting mechanism

As best shown in Figs. 6 and 12, a series of small pins 165 are slidable in perforations 166 in the mold member 33, said pins being movable in spaced parallel relation to each other by a plate 167. This plate is movably disposed in a suitable space between the carriage 135 and back face of the mold member 33. A pair of pins 165a are positioned to strike the face of the member 32 when the mold is closed and thereby retract the ejector pins 165 from the interior mold recess. Rigidly secured to the back face of the plate 167 is a large pin 168 which projects to be struck by a hammer 169. The hammer is centrally supported on the carriage 135 upon a pivot pin 170 and is normally drawn toward the pin 168 by a pair of coiled tension springs 171 (Figs. 2 and 6). Projecting from the top of the hammer 169 is a tooth 172 adapted to be engaged by a latch member 173 having a pivot shaft 174 on the ram head 150. The latch member 173 is fixed on the shaft 174 as is also a crank arm 175 carrying a set screw 176. An actuating arm 177 is freely pivoted on the shaft 174 and extends downward so that its end 178 strikes a frame member 179 as the ram head 150 approaches the extremity of its stroke causing an opening of the mold. The arm 177 is bifurcated at its end having a bearing on the shaft 174 and the crank 175 is fixed on said shaft between the bifurcated portions of said arm so that the lower end of the set screw 176 is struck by the arm 177 to release the tooth 172 at the proper moment in the cycle of operation.

Grid delivering mechanism

Upon the bottom of the carriage 135 is secured a toothed rack 180 adapted to rotate a pinion 181 fixed on a horizontal shaft 182. This shaft has suitable bearings supported in a transverse frame member 183 and at one end is operatively connected to an oblique shaft 184 by bevel gears 185 (Figs. 1 and 6). The shaft 184 has a fixed bearing at its upper end and a bracket arm 186 supports a bearing for its lower end. As shown in Figs. 1, 3, 6 and 7, the bracket 186 is secured by bolts 187 to a bearing support 188 mounted on one of the legs 189 of the machine. This bearing support 188 also is formed with a bearing for a horizontal shaft 190 connected to the shaft 184 by bevel gears 191. The shaft 190 extends across the machine and is supplied near the center of the machine with a pinion 192 in mesh with a vertical rack 193. A suitable guide 194 is rigidly secured to a transverse frame member 195 and this guide slidably receives the rack 193 and an arm 196 which projects in continuation of said rack. On the upper end of the arm 196 is secured a transverse member 197 upon which the fingers 35 are mounted. The lower ends of the fingers 35 are hook shaped to receive and support the grids in oblique position. The shaft 190 projects at one side of the machine, as shown in Figs. 2, 3 and 7, and beneath the shaft is a support 198 for a bearing 199 and a clutch lever 200. One of the gears 191 is freely revoluble on the shaft 190 and is held against longitudinal movement thereon by said bearing 199, as best shown in Fig. 7.

Integral with the gear 191 is a clutch disk 201 adapted to be engaged by a disk 202 which is movable by the lever 200 against the action of a coiled spring 203. The clutch member 202 is keyed to the shaft 190 but slidable longitudinally thereon. The lever 200 has the usual bifurcated portion 204 engaging a ring 205 in an annular groove in the hub of the disk 202. When it is desired to render the grid delivery fingers 35 inoperative, the lever 200 is manipulated to disengage the disk 202 from the disk 201. This leaves the gear 191 free to rotate on the shaft 190 and the rack 193, carrying the fingers 135, falls to substantially the dotted line position shown in Fig. 6, if it is elevated when the clutch lever is actuated. Now the mold carriage may be continued in operation while access to the interior of the mold is free of the obstructions which would be created by the delivery fingers 35.

A pair of parallel, endless chains 36 are arranged to convey the grids from a position beneath the mold to the receiving rack 37. The chains 36 are spaced apart a distance substantially equal to the width of the grids 206 so that said grids may be suspended from their lugs 207, as indicated in dotted lines in Figs. 1 and 6. The chains are driven in timed relation to each other by a pair of sprocket wheels 208 (Figs. 1 and 3) fixed on the shaft 161. They are also guided over sprocket wheels 209 and 210 mounted on stub shafts 211 and 212 respectively. Lugs 213 secured to the chains 36 at suitable spaced intervals are arranged in pairs to positively engage the lugs 207 and thereby convey the grids to the racks 37. As shown in Figs. 1 and 6, a retarding device 214 extends obliquely into the path of the grids as they start on their path toward the racks 37. This retarding device consists of a plate rigidly held in oblique position beneath the upper run of the chains 36 so as to straighten the grids and insure positive engagement of their lugs 207 with a pair of the chain lugs 213. Rigid, supporting arms 215 project upward from frame members 216 and a transverse rod 217 connects the upper ends of the arms 215 to support the retarding device 214.

As shown in Figs. 1, 2 and 3, the power-driven shaft 159 is provided with a worm 218 on one end which rotates a worm wheel 219 on the end of a shaft 220 journaled in downwardly projecting bearings 221. A sprocket wheel 222 adjacent to the furnace 30 on the shaft 220 actuates a chain 223 for driving the cam shaft 58 of the metal supply mechanism, said chain, in turn, driving a sprocket wheel 224 on the end of the shaft 58. This chain 223 may be readily removed when it is desired to separate the frames carrying the mold and furnace respectively. This separation is facilitated by providing flanged wheels 225 running on the track 38 and supporting, as a unit, the casting and delivery mechanisms, including the conveying and collecting devices.

Operation

The motor 163 normally drives the shaft 34 through the gear reduction 162, shaft 161, chain 160, shaft 159, pinion 158 and gear 157. The discs 156, by which the connecting rods 155 are operated, are thus rotated. With the connecting rods in their outermost position the mold member 33 is in its fully open position. The connecting rods 155 thrust the ram head 150 toward the mold and by the stout springs 164 movement is transmitted to the mold carriage 135 thus advancing the mold member 33 toward closed position. The member 33 is now closed against the member 32 and further advance of the carriage 135 stopped. However, the head 150 continues to move toward the mold against the action of the springs 164 while the stop lug 151 is moved out of engagement with the screw 152 (Figs. 9 and 11) and the extension 149 advances between the bifurcated portions 148 of the bars 143. As the cross head approaches the extremity of its forward movement, the latch member 173 passes over the top of the tooth 172 to engage the hammer 169.

During the advance of the carriage 135 the rack 180 actuates the pinion 181 to rotate the shafts 182 and 184 and thereby retract the fingers 35 from between the mold members where they have been advanced on the previous stroke. Thus when the mold is closed the members 35 have been retracted substantially to their dotted line position shown in Fig. 6. It will be noted that the mold member 35 dwells in its closed position while the springs 164 are being compressed and also while they are allowed to expand, as hereinbefore described. During this period of dwell the metal delivery mechanism operates in a manner which will now be described.

With the metal delivery mechanism shown in Figs. 13, 14, 16, 17 and 18, the head 61 is raised to open the port 50 and thus admit molten metal from the lead pot 40 into the throat 51. A measured quantity is admitted as the cam 66 depresses the adjacent end of the lever 65 and thereby raises the plunger 62 carrying the head 61 momentarily. The cam shaft 58 is normally driven by the sprocket chain 223 which is operated in turn by the connections including the shaft 220, worm wheel 219, worm 218 and shaft 159. The head 61 is immediately returned to closed position and then the cam 57 on the shaft 58 actuates the lever 56 to open the air valve 54 and admit a predetermined volume of air from the pipe 53. The quantity which is thus admitted to the air chamber 52 may be adjusted by manipulating the valve 60 on the escape pipe 59. The charge of air enters the chamber 52 and forces the contents of the throat 51 out through the spout 31 into the slot 127 communicating with the interior of the mold. This stream of metal is uniformly distributed in the mold by our arrangement of the thin, wide passage 68 in the spout 31. To insure the delivery of a ribbon-like stream of uniform thickness we provide the leveling device for the spout 31 hereinbefore described.

In the alternate form of metal delivery mechanism, shown in Figs. 20 to 23 inclusive, the sprocket wheel 119 is connected to the sprocket wheel 222 by a suitable chain so that the shaft 106 is continuously rotated. Starting with the piston 83 in elevated position at the moment a charge of metal is required in the mold the crank 110 on the shaft 106 actuates the valve 100 through its connections including the link 111, crank 109, shaft 108 and bevel gears 107 to place the bottom of the cylinder 88 in communication with the air supply pipe 101. The air thrusts the piston 87 upward so that the piston 83 displaces a measured quantity of the molten metal through the throat 82 communicating with the spout 31. After delivering the charge of molten metal the piston 83 is immediately returned to elevated position by reverse movement of the valve 100.

The molten metal fills the interstices of the mold to form a pair of grids like those illustrated in Fig. 12a. The metal immediately solidifies by cooling while the head 150 starts on its reverse stroke. During the first part of this stroke the springs 164 retain the mold in closed position and permit relative movement between the head 150 and carriage 135. During this movement the latch member 173, which has previously moved into engagement with the tooth 172, draws the hammer 169 back against the action of the springs 171. Now separation of the head 150 and carriage 135 is stopped by engagement of the lugs 151 with the screws 152 and further movement of the head 150 moves the mold member 33 to open position. As the carriage 135 moves to open the mold the rack bar 180 on the bottom of said carriage rotates the pinion 181 and, through the connections hereinbefore described, raises the rack 193 carrying the fingers 35. When the carriage 135 reaches the outer extremity of its movement the fingers 35 are fully extended into the mold, as shown in Fig. 6.

The grids which are carried by the mold member 33 are now forcibly discharged from the mold onto the fingers 35. This is effected by the movement of the end 178 of the arm 177 into engagement with the frame member 179 so as to raise the crank 175 and turn the shaft 174 thereby carrying the latch member 173 out of engagement with the tooth 172. The springs 171 now actuate the hammer 169 forcibly against the pin 168 so that the pins 166 are simultaneously projected into the mold apertures to suddenly free the grid. It will be understood that battery grids have a multiplicity of thin members which resist an ordinary force tending to detach them from the mold because of a non-uniform adherence to the mold and there is danger of distorting the grids by the ejecting device. The pins 166 are distributed over the face of the mold so as to free the grids wherever they have a tendency to adhere. We have further found that it is important in order to properly free the grids that a sudden breaking away be produced by force distributed over the face of the mold. The ejected grids drop onto the inclined fingers 35 with the lugs 207 projecting laterally from the lower corner.

As the cross head again starts on its advance stroke the rack 180 reverses the movement of the pinion 181 so as to retract the fingers 35 from the mold. The fingers 35 move downward carrying the grid and as the hooked lower ends of the fingers 35 cross the plane of the chains 36 the lugs 207 on the grids are caught by the chains traveling in the direction indicated by an arrow in Fig. 6. Continued downward movement of the fingers 35 causes the grid to be suspended from the chains 36 which advance it against the retarding plate 214. This plate straightens the grid transverse the chains and insures proper engagement of the lugs 207 with the chain lugs 213. The grids are successively deposited on the sloping rack 37 by the chains 36 and are thus collected, as indicated in dotted lines in Fig. 1.

When it is desired to clean or prepare the faces of the mold members 32 and 33 without entirely shutting down the machine, it is only necessary to shut off the air supply to the metal delivery mechanism (pipe 53 or 101) and to actuate the clutch lever 200 so that one of the bevel gears 191 is free to rotate on the shaft 190. The rack 193 is thus released so that the fingers 35 are retracted from the mold.

By making the mold members 32 and 33 readily removable, we adapt our machine to the manufacture of grids of the various sizes and kinds which are required. To replace one of said mold members by another the chain 223 is disconnected from the sprocket 224 (Fig. 1) or in the case of the alternate type of metal delivery mechanism shown in Figs. 20 to 23 inclusive, the sprocket 119 is released from its driving chain and then the entire frame supported on the wheels 225 is moved along the tracks 38 to allow an attendant to pass between the furnace 30 and mold. This gives access to the bolts 122 and 123 for securing the normally stationary mold member in the frame. To release the movable mold member 33, the screws 141 are loosened so that the springs 142 separate the wedge blocks 140 and the mold member 33 may then be raised from its seat on the bolts 138. The substitute mold members may be inserted and adjusted to properly registered positions by manipulation of the bolts 121, 122 and 123 for the stationary mold member and the bolts 141 and 138 for the movable mold member. The passage 68 in the spout 31 may be quickly and easily cleaned after manipulating the clamp handles 72 and removing the plate 69.

Having described our invention what we claim as new and desire to protect by Letters Patent is:

1. In a grid casting machine, a mold having stationary and movable members adapted to be separated for the removal of the grids from between them, a power actuated ram head, a ram carriage supporting said movable member, said carriage and head being relatively movable, extensible and retractile members connecting said head and carriage, an adjustable stop for extension movement of said last mentioned members, a spring normally holding said carriage and ram head apart to render said stop operative, said head being movable against the action of said spring when the mold is closed to cause said movable member to dwell in closed position during a substantial part of the cycle of movement of said head.

2. In a grid casting machine, a mold having relatively movable members adapted to be separated for the removal of the grids from between them, a carriage supporting one of said mold members, a head movable relative to said carriage, resilient means normally urging said head and carriage apart, power-driven means for imparting to said head a cycle of movement to open and close the mold, said resilient means being compressed during a part of said cycle to permit relative movement between said head and carriage, ejector members extensible from one of said mold members to eject the grids therefrom and means for actuating said ejector members comprising, a hammer pivotally mounted on said carriage, a spring for actuating said hammer to extend said ejecting members, a latch member carried by said head and formed to engage said hammer and means for releasing said hammer from said latch member at a predetermined point in the travel of said carriage to eject the grids.

3. In a casting machine, a mold having relatively movable members adapted to be separated for the removal of the molded objects, power-driven means for opening and closing said mold, a delivery device extensible between said mold members to receive the molded objects, means for ejecting the molded objects onto said delivery device, connections for actuating said ejecting mechanism, mechanical connections for extending said delivery device between said mold members and for retracting the same therefrom, said delivery device being normally positioned directly between said members and in the path of one of them when the same are separated, and a clutch interposed in said last mentioned connections for rendering said delivery mechanism inoperative independently of the mold actuating mechanism, said clutch permitting withdrawal of said delivery mechanism from between said mold members when the same are in open position to permit the manual removal of the molded objects from the molds.

4. In a casting machine, relatively movable mold members adapted to be separated in a substantially vertical plane to permit the withdrawal of the molded objects, mold operating mechanism for imparting movement to at least one of said mold members to open and close the mold, a conveyor for the molded objects disposed beneath the mold, a delivery device extensible between and in the path of at least one of said mold members to receive a molded object and retractile beneath the mold to deposit the molded object on said conveyor and means for imparting to said delivery device rectilinear, reciprocating movement to and from the opening between said members in timed relation to said mold operating mechanism.

5. In a grid casting machine, a mold member, a support for said mold member having a surface adapted to slidably engage said member and a wedge block disposed on said support and movable thereon to grip said mold member against said surface.

6. In a grid casting machine, a mold member, a support for said mold member having a surface adapted to slidably engage said member, means for adjusting the position of said member relative to said surface, and a wedge block movable on said support to grip said mold member against said surface in positions determined by said adjusting means.

7. In a grid casting machine, a mold member, a support for said mold member having a surface adapted to slidably engage said member, a pair of wedge blocks to grip said mold member against said surface and a screw for actuating said blocks to grip said member.

8. In a casting machine, the combination with a mold having a long metal receiving slot in the top thereof, of a metal supply spout for said mold adapted to deliver metal thereto in a thin stream of uniform thickness and means for adjusting the level of said spout transverse the direction of flow of said stream to secure said uniformity in thickness.

9. In a casting machine, the combination with a mold having a long metal receiving slot in the top thereof substantially equal in length to the length of the object to be formed, of a metal supply spout for said mold adapted to deliver metal thereto in a thin stream of uniform thickness comprising, a wide bottom member and a cover plate mounted in spaced parallel relation to each other and means for adjusting the level of said spout transverse the direction of flow of said stream, the passage formed by said bottom member and cover plate being substantially equal in extent horizontally to the length of the slot.

10. In a casting machine, the combination with a mold having a long metal receiving slot in the top thereof, of a metal supply spout for said mold adapted to deliver metal thereto in a thin stream of uniform thickness comprising, a wide bottom member and a removable cover plate mounted in spaced parallel relation to each other and clamping means for removably securing said cover plate to said bottom member.

11. A casting machine having in combination separable mold members, means for ejecting a molded object from said members and delivery mechanism for removing said object from the mold comprising an inclined support for a side of said object, a support for the lower edge of said object secured to said inclined support and means for moving said inclined support between said mold members to receive said object when said members are separated.

12. A casting machine having in combination separable mold members, means for ejecting a molded object from said members and delivery mechanism for removing said object from the mold having an inclined support for a side of said object and means for moving said inclined support between said mold members and in the path of one of them when the same are separated.

13. A casting machine having in combination separable mold members, means for ejecting a molded object from said members and delivery mechanism for removing said object from the mold comprising a steeply inclined support for a side of said object, a support for the lower edge of said object secured to said inclined support, means for moving said inclined support between said mold members and in the path of one of them when said members are separated and means for actuating said ejecting mechanism when said support is positioned between said mold members.

14. In a battery grid casting machine having separable mold members and a grid delivery device movable between said mold members and in the path of one of them, means for opening and closing said mold members, means for extending said delivery mechanism between said mold members when in open position, mechanical means connecting said last mentioned means to said mold, operating means to actuate the same in timed relation to each other, said delivery mechanism being normally positioned between said mold members when the same are separated and a clutch interposed in said connections to permit movement of said delivery mechanism out of the path of said mold members independently of the movement of the mold members.

15. In a battery grid casting machine having relatively movable mold members adapted to be separated for the removal of grid castings, said members having a restricted space between them when separated, delivery mechanism having a member movable to and from said restricted space, mechanical means for actuating said delivery mechanism in timed relation to said mold members whereby said delivery mechanism is normally positioned between said mold members when the latter are separated and a control for movement of said delivery mechanism independently of the movement of said mold members permitting removal of said delivery mechanism from said restricted space during the period of separation of said mold members.

16. In a casting machine having separable mold members and ejector mechanism to eject the castings from the mold, said ejector mechanism having a member projecting from the exterior of the mold, a support for a hammer exterior of the mold, a hammer movably mounted on said support to impinge on said projecting member of the ejector mechanism, a spring arranged to urge said hammer to strike said projecting member, a detent arranged to retain said hammer out of operative position against the action of said spring and means for releasing said detent to render said hammer operative to impinge against said ejector mechanism under the action of said spring.

17. In a battery grid casting machine having relatively movable mold members adapted to form battery grids having horizontally projecting lugs, said members being arranged to be separated in a substantially vertical plane to permit the removal of the grids, a conveyor for the grids disposed directly beneath said mold, said conveyor having spaced parallel chains to engage the lugs of the grids, a substantially vertically movable, delivery device extensible between and in the path of at least one of said mold members to receive a grid, said delivery device being retractile beneath the mold to deposit the grids on said conveyor and power-driven means for actuating said mold, delivery device and conveyor in timed relation to each other.

GEORGE N. GOODRICH.
CARL G. REETZ.